United States Patent [19]

Takahashi et al.

[11] Patent Number: 4,837,582
[45] Date of Patent: Jun. 6, 1989

[54] METHOD AND APPARATUS FOR DETECTING ELECTROMAGNETIC WAVES GENERATED BY THE EARTH'S CRUST UNDER STRAIN

[75] Inventors: Kozo Takahashi; Yoshihisa Masuda; Hisao Inuki, all of Tokyo, Japan

[73] Assignees: Communications Research Laboratory; Ministry of Posts and Telecommunications, both of Tokyo, Japan

[21] Appl. No.: 138,947

[22] Filed: Dec. 29, 1987

[30] Foreign Application Priority Data

Jan. 27, 1987 [JP] Japan .................................. 62-15177

[51] Int. Cl.$^4$ ............................................. H01Q 1/04
[52] U.S. Cl. .................................... 343/719; 343/841; 324/323; 324/344
[58] Field of Search ............... 343/709, 710, 841, 719, 343/846, 720, 834, 837, 838; 324/344, 332–334, 337, 338, 323, 365; 455/40

[56] References Cited

U.S. PATENT DOCUMENTS

| | | | |
|---|---|---|---|
| 1,388,336 | 8/1921 | Hanson | 343/719 |
| 1,388,949 | 8/1921 | Hanson | 455/40 |
| 4,030,032 | 6/1977 | Wheeler | 343/719 |
| 4,088,998 | 5/1978 | Rawls | 343/719 |
| 4,207,568 | 6/1980 | MacLeod | 455/40 |
| 4,724,390 | 2/1988 | Rauscher et al. | 324/344 |

FOREIGN PATENT DOCUMENTS 62-103596  5/1987  Japan .

Primary Examiner—William L. Sikes
Assistant Examiner—Michael C. Wimer
Attorney, Agent, or Firm—Oblon, Spivak, McClelland, Maier & Neustadt

[57] ABSTRACT

An antenna element such as a monopole, dipole or loop antenna is located in the earth or on the floor of the sea so as to receive pre-earthquake electromagnetic waves generated prior to the occurrence of an earthquake. Unwanted noise waves propagating in the air such as man-made noise are effectively eliminated by a reflector laid on the surface of the earth or by the sea water and only the required pre-earthquake waves are detected by the antenna element, whereby earthquakes can be predicted reliably.

18 Claims, 2 Drawing Sheets

METHOD AND APPARATUS FOR DETECTING ELECTROMAGNETIC WAVES GENERATED BY THE EARTH'S CRUST UNDER STRAIN

BACKGROUND OF THE INVENTION

1. Field of the Invention

This invention relates to a method and apparatus for detecting electromagnetic waves which are generated when pressure and strain are exerted on the earth's crust, and more particularly, to a method and apparatus for detecting electromagnetic waves generated as a premonitory symptom of earthquakes in such manner as to discriminate these electromagnetic waves from man-made noise, static and other radio or electromagnetic waves.

2. Prior Art Statement

It is known that large changes in pressure and strain occur in the earth's crust in and around a seismic region prior to the occurrence of an earthquake. It is also known that earthquake-prone regions of the earth crust are constituted mainly of rock or base rock consisting of ionic crystal which generates electricity (piezoelectricity) under pressure and strain, and that electromagnetic waves are generated when changes arise in the generated electricity. These electromagnetic waves have frequencies ranging from a direct current component to higher harmonics, and the waves having a frequency above about 3 kHz are greatly attenuated while traveling through the earth. Thus, when the seismic region lies deep within the earth, there is little possibility of being able to detect the 3 kHz and higher frequency electromagnetic waves produced by the seismic region at the surface of the earth. However, for reasons that will be explained below, electromagnetic waves generated by changes in pressure and strain can be detected at positions near the surface of the earth which are remote from the seismic region. As one example, there will be considered the case in which electromagnetic waves are produced by piezoelectricity. The amount of electromagnetic waves per unit volume of the rock producing piezoelectricity is proportional to the square of the amount of change in pressure or strain exerted on the rock. On the other hand, the amount of change in earth crust pressure or strain is inversely proportional to approximately the square of the distance from the seismic region to the point at which the electromagnetic waves are detected. In other words, the amount of electromagnetic waves generated at a point located a given distance from the seismic region is inversely proportional to approximately the fourth power of the distance. Within the earth, therefore, the electromagnetic waves produced at the seismic region appear to be attenuated in proportion to approximately the fourth power of the distance. An attenuation proportional to the fourth power of the distance is the same rate of attenuation as that of scattered radar waves. This means that it is possible to detect the 3 kHz and higher frequency electromagnetic waves produced as a premonitory symptom of an earthquake. However, when the electromagnetic waves are actually received by an antenna, they are received together with man-made noise, static and other extraneous radio waves. Thus it is possible to use the pre-earthquake electromagnetic waves for the prediction of earthquakes only if these waves can be discriminated from other radio waves constituting noise.

As far as is known, only the following two methods have been used for discriminating pre-earthquake electromagnetic waves from other radio or electromagnetic waves:

(1) The method as described in Japanese Patent Public Disclosure No. SHO 62(1987)-103596 wherein discrimination is carried out on the basis of the difference in dynamic spectra between the pre-earthquake electromagnetic waves and other radio waves; and (2) The method which utilizes the fact that man-made noise and static are attenuated at points deep within the earth. In this method, the discrimination is carried out within abandoned mines or underground caverns at a depth of 500 m or more below the earth's surface, at which depth the difference in strength between the pre-earthquake electromagnetic waves and the other radio waves is large.

However, for carrying out the first method based on the difference between the dynamic spectra of the electromagnetic and radio waves, it is necessary to have a large amount of actually measured seismic data. As the amount of such data accumulated to date is not sufficient for the purpose, this method cannot be put into immediate use.

While the technology for implementing the second method of subterranean observation and discrimination has already been established, there is no assurance that an appropriate mine or cavern will be available in the region in which it is desired to carry out earthquake prediction. Nor is it always possible to bore an appropriate hole to such a depth. The areas in which this method can be applied are thus limited.

OBJECT AND SUMMARY OF THE INVENTION

An object of this invention is to provide a method and apparatus for detecting pre-earthquake electromagnetic waves which overcome the aforesaid shortcomings of the prior art.

Another object of this invention is to provide a method and apparatus for easily detecting pre-earthquake electromagnetic waves at any desired point on land or sea with high accuracy.

To accomplish the object described above according to this invention, there is provided a method for detecting pre-earthquake electromagnetic waves, which comprises providing one or more linear elements constituting an antenna, each having a length equal to approximately one quarter of the wavelength of the electromagnetic waves to be received.

When the invention is applied on land, the steel pipe casing of a deep well or a conductive cable inserted within such a casing is used as the linear element of a monopole antenna and conductive plates or wires are laid on the surface of the earth with the linear element at the center to provide the monopole antenna with a reflector for preventing radio waves above the earth from propagating into the earth. In this way, reception of the pre-earthquake electromagnetic waves from the earth which are relatively free from man-made noise can be carried out reliably.

When the invention is applied offshore, a dipole or loop antenna is positioned on or near the sea bottom and the sea water inhibits the propagation of radio waves above the sea surface to the sea bottom. In this way, the difference in strength between the pre-earthquake electromagnetic waves traveling through the earth and the other radio waves becomes great at the point of reception, whereby the pre-earthquake electromagnetic waves can be accurately detected.

The above and other objects and features of the invention will become more apparent from the following detailed description with reference to the accompanying drawings.

DETAILED DESCRIPTION OF THE PREFERRED EMBODIMENTS

Figure 1:
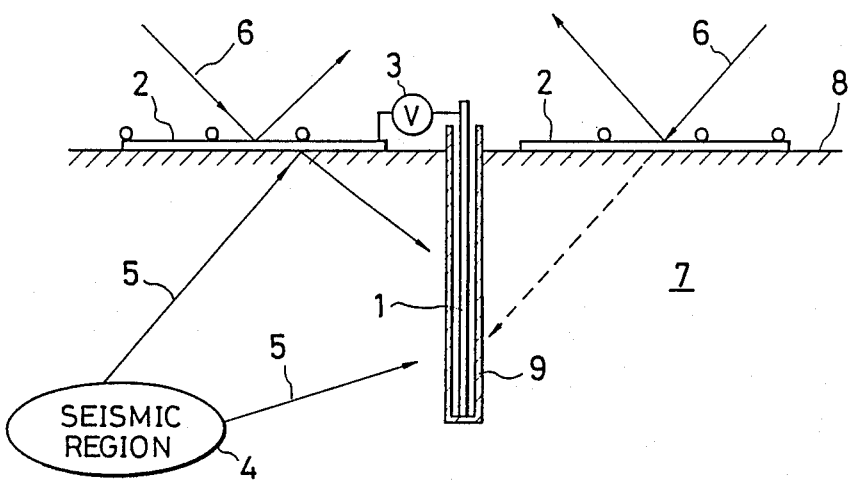
FIG. 1 is an explanatory view of the manner of receiving pre-earthquake electromagnetic waves by the method of one embodiment of the present invention as applied on land.

FIG. 1 shows the case where the observation for earthquake prediction is carried out on land. In this case, a linear element 1 of a monopole antenna for receiving electromagnetic waves generated from the earth's crust under pressure and strain is embedded in the earth and a reflector 2 for the monopole antenna is provided with the linear element 1 at the center thereof.

It is preferable for the conductive cable to have a length equal to approximately one quarter of the wavelength of the electromagnetic wave to be received. For instance, an electromagnetic wave having a frequency of about 1 kHz has a wavelength of about 3.16 km because a refractive index of wet soil is about 94.8 at 1 kHz, and therefore, the wavelength of an electromagnetic wave propagating through the soil becomes 1/94.8 of that in the air. Therefore, in the case that an electromagnetic wave of about 1 kHz is to be detected, it is sufficient for the linear element used as an antenna in this invention to have a length of about 1,000 m, though, to be exact, a quarter wavelength of the 1 kHz wave would measure 790 m.

The linear element 1 embedded in the earth can be obtained by inserting a conductive cable into the casing 9 of a deep well. If the deep well casing 9 is a steel pipe, the steel pipe can itself be used as the linear element. If the deep well does not have a casing, the conductive cable is inserted directly into the well.

The cable can be with or without an insulation cladding. Where the casing of a deep well is to be used as the linear element, it should preferably extend to a depth of at least 1,000 m and have a diameter of at least 10 cm. Where a cable is to be inserted into a deep well as the linear element, it is preferable to use a helical cable since this increases the capacitance of the antenna.

The reflector 2 for the monopole antenna is typically constituted by laying a plurality of conductive wires to extend radially from the linear element 1 at the center. Alternatively the reflector 2 may be an annular plate. The members of the reflector 2 can be with or without an insulation cladding. Part or all of the reflective surface of the reflector 2 can be formed using existing underground water or gas pipes. In a case where no measurement is to be made of the direct current component of the electromagnetic waves, if both the linear element 1 and the reflector 2 are uninsulated, direct current will flow between them, which will have an effect on the received electromagnetic waves. In this case, therefore, it is necessary to clad one or the other with an insulating material. The diameter of the reflecting surface of the reflector 2 as measured from the linear element 1 should not be less than the length of the conductive cable embedded in the earth so that external noise such as man-made noise propagating in the air toward the earth can be completely reflected. When the reflector 2 is constituted of wires or rods, the wires or rods should preferably be laid both radially from and concentrically with the linear element 1, with the crossing points of the radial and concentric wires electrically connected with each other. While the spacing between adjacent wires will depend on the frequency of the electomagnetic waves to be received, in view of the fact that the frequency of the electromagnetic waves to be received is generally not higher than 80 kHz, a spacing of about 10 m is ordinarily appropriate.

As will be understood from FIG. 1, the purpose of the reflector 2 is to reflect atmospheric radio waves 6 and subterranean electromagnetic waves 5. While it therefore suffices to provide the reflector 2 on the surface 8 of the earth, it may be better to bury it to a certain depth in cases where there is a danger of its being damaged by humans or animals. Where the reflector is to be installed or agricultural land, it is important that it be buried deep enough to be safe from being cut by cultivators and the like.

With the aforesaid arrangement, when subterranean electromagnetic waves 5 (i.e. pre-earthquake electromagnetic waves) are produced from a seismic region 4, the electromagnetic waves 5 propagate through the earth 7 and reach the linear element 1 both directly and after being reflected by the reflector 2 installed at the surface of the earth, whereafter they are detected by a receiver 3. On the other hand, a large part of such atmospheric radio waves 6 as man-made noise and static is reflected by the reflector 2, while the small portion thereof that enters the ground passes through the earth 7 and reaches the linear element 1 in an attenuated state.

The pre-earthquake electromagnetic waves received by the receiver 3 include the wave component reflected by the reflector in addition to that directly received by the antenna, and therefore, are about twice as strong as those received by conventional methods, while the other radio waves (noise) received are weaker. The intensity ratio between the two types of electromagnetic waves is thus increased, making it possible to discriminate them on the basis of the difference in strength. As a result, the pre-earthquake electromagnetic waves can be reliably detected.

Figure 2:
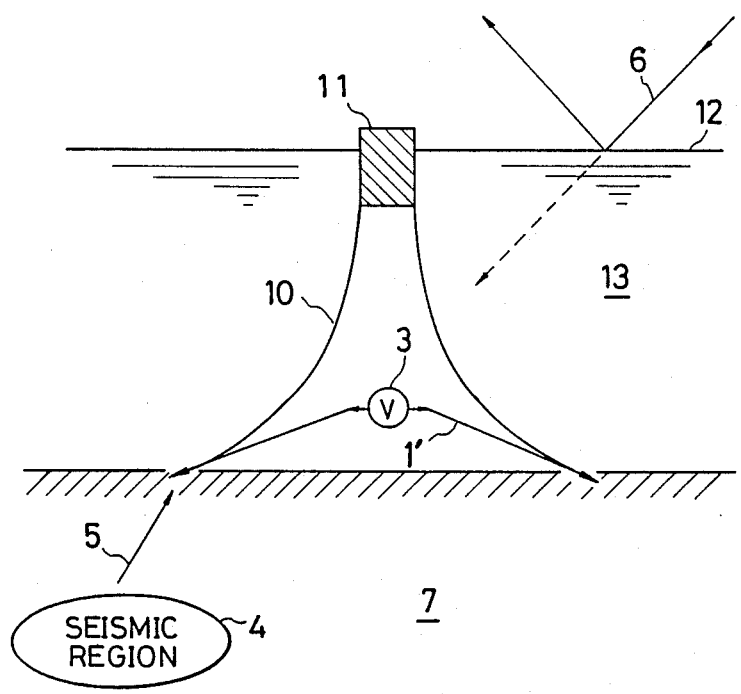
FIG. 2 is an explanatory view showing one example of the manner of receiving pre-earthquake electromagnetic waves by the method of another embodiment of the present invention as applied offshore.

FIG. 2 shows an example of the observation for earthquake prediction being carried out offshore. In this case, two mooring lines 10 anchored at one end to the sea bottom are attached at the other end to a mooring buoy 11, and an antenna 1' is attached therebetween. The antenna 1' in this embodiment is composed of two or more linear elements connected to each other through a receiver 3 so as to form a dipole antenna. For the antenna, there may be used a loop antenna. The mooring buoy 11 should preferably be located at a position where the depth of the sea is 200 m or more so that atmospheric radio waves 6 entering into the sea are absorbed by the sea water 13 and completely disappear before they reach the sea bottom. Thus, in this embodiment, the sea water 13 functions as the reflector used in the former embodiment. The receiver portion should be at a depth of 100 m or more. All the elements constituting the antenna have to be made from insulated conductive cables, which are grounded at their ends. Where a dipole antenna structure is used, it is not necessary for the linear elements of the antenna to be linearly attached to the mooring lines 10. In the case of the loop antenna, it is in fact preferably for them to be made in the form of coils so as to increase the inductance. The mooring lines 10 may be either conductive or non-conductive.

With the aforesaid arrangement, when subterranean electromagnetic waves 5 (i.e. pre-earthquake electromagnetic waves) are produced in the vicinity of a seismic region 4, the electromagnetic waves 5 propagate through the earth 7 and reach the dipole or loop antenna 1', whereafter they are detected by the receiver 3. On the other hand, part of the atmospheric radio waves 6 is reflected by the sea surface 12 and the remainder thereof enters the sea and is attenuated while propagating through the sea water 13 on the way to the antenna 1'. Therefore the pre-earthquake electromagnetic waves are strongly received by the receiver 3, while reception of the other radio waves is weak. The intensity ratio between the two types of radio waves is thus increased, making it possible to discriminate them on the basis of the difference in strength.

Figure 3:
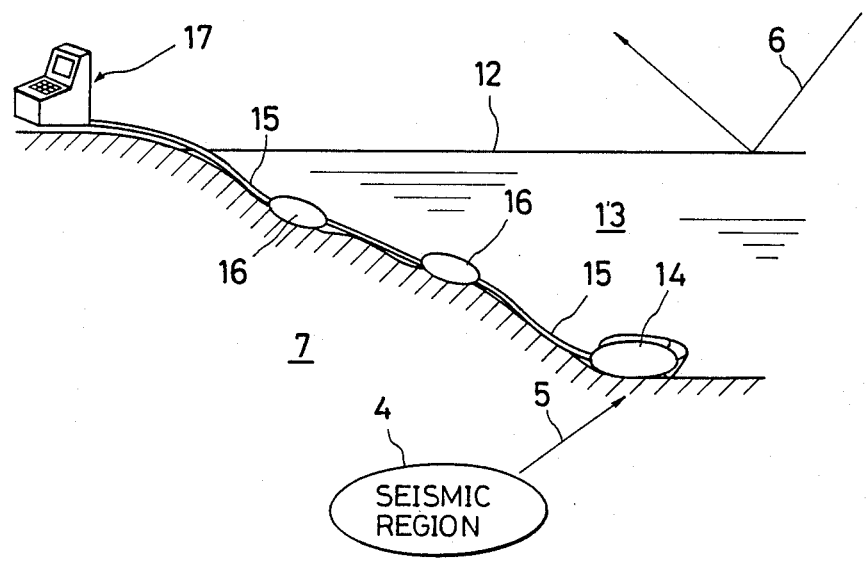
FIG. 3 is an explanatory view showing still another embodiment of the present invention as applied offshore.

FIG. 3 illustrates another embodiment of the invention as applied to offshore seismic observation. In this embodiment, a sensor 14 equipped with a dipole or loop antenna and a receiver is appropriately positioned on the floor of the ocean, and the sensor 14 is connected with a land-based observation system 17 by a cable 15 that passes through one or more repeaters 16. The repeaters 16 are designed to maintain the strength of the signal from the sensor 14 within a prescribed range by amplifying it by an amount sufficient to compensate for the attenuation thereof during transmission.

In the case where the sensor 14 is equipped with a loop antenna, if the pressure-resistant vessel incorporating the sensor 14 is not a good conductor, the aforesaid insulated conductive cable constituting the antenna element can be located inside the pressure-resistant vessel. When a dipole antenna is used, the insulated conductive cables of the linear elements should preferably be disposed to extend across the ocean floor in four directions and are grounded at their ends so that two perpendicularly intersecting dipole antennas are formed.

The sensor 14 can be easily disposed at a great depth and, when it is, the antenna thereof receives substantially only the pre-earthquake electromagnetic waves 5 propagated through the earth 7 from the seismic region 4 since the part of the noise radio waves 6 from the atmosphere entering the sea 13 is greatly attenuated while traveling to the sensor 14 at the sea bottom. As a result, only the required pre-earthquake waves can be detected with high precision.

The computation for determining the seismic region and for estimating the magnitude of the impending earthquake can be accomplished using existing techniques. More specifically, the direction from which the radio waves arrive is detected at two or more observation points and the seismic region is found from the point of intersection of these directions. In the case of land observation, this is accomplished by the disposal on the surface of the earth of one or more an auxiliary loop antennas or other type of directional antennas. In the case of offshore observation according to the second embodiment shown in FIG. 2 it is accomplished by attaching to the mooring lines 10 two perpendicularly intersecting dipole antennas, while in the case of offshore observation according to the third embodiment shown in FIG. 3 it is accomplished by providing the sensor 14 with two perpendicularly intersecting dipole antennas. Where three or more observation points are provided, it is possible to determine the location of the seismic region from two points of intersection of hyperbolic curves, whose foci are the points at which an observation is conducted. Where two or more observation points are provided, the location of the seismic region can be determined from the intersections of the hyperbolic curves and the direction of arrival of the electromagnetic waves detected by a directional antenna.

The intensity of the pre-earthquake electromagnetic waves is approximately proportional to intensity of the earthquake which is to occur and is approximately inversely proportional to the fourth power of the distance between the seismic region and the point of reception. It is therefore possible to estimate the magnitude of the impending earthquake from the intensity of the received pre-earthquake electromagnetic waves.

Pre-earthquake electromagnetic waves are produced between two weeks and two hours prior to the occurrence of the earthquake and have a frequency of 80 kHz or less, but as explained in the foregoing, it has been difficult to discriminate these electromagnetic waves from other noise radio waves. In accordance with this invention, however, pre-earthquake electromagnetic waves can be detected at a much greater strength than other noise radio waves, whereby it becomes easy to discriminate the pre-earthquake waves. As there are distinct differences between pre-earthquake or principal-shock electromagnetic waves and aftershock electromagnetic waves (namely, the aftershock waves are weaker in the frequency component below 3 kHz in comparison with the pre-earthquake or principal-shock waves), the present invention makes it possible to predict an earthquake two hours before the principal shock happens.

What is claimed is:

1. A method for detecting pre-earthquake electromagnetic waves comprising the steps of:
   using a monopole antenna comprising a linear element formed of a conductive material having a length equal to approximately one quarter of the wavelength of the electromagnetic waves to be received and a reflector composed of one or more conductive elements and having a reflection diameter larger than the length of said linear element,
   placing said linear element to extend vertically within the earth,
   placing said reflector on the surface of the earth so that a center thereof is at said linear element, thereby substantially preventing external electromagnetic waves above the earth from passing into the earth and reflecting internal electromagnetic waves from within the earth onto said linear element to increase an intensity ratio of the internal electromagnetic waves to the external electromagnetic waves received by said linear element, and
   connecting a receiver for detecting the electromagnetic waves reaching said linear element between said linear element and said reflector.

2. A method according to claim 1, wherein said linear element is composed of a steel casing and inserted in a deep well.

3. A method according to claim 1, wherein said linear element is inserted into a deep well.

4. A method for detecting pre-earthquake electromagnetic waves, comprising the steps of:

arranging two moor lines positioned in a sea so as to be anchored at their one ends to the sea bottom at a depth which substantially eliminates external electromagnetic waves from above the sea surface and attached at their other ends to a mooring buoy, and electrically connecting two linear elements of insulated conductive material, each having a length equal to approximately one quarter of the wavelength of the electromagnetic waves to be received, at their one ends to said mooring lines located at said depth which substantially eliminates said external electromagnetic waves and at their other ends to a receiver for detecting the electromagnetic waves at an increased intensity ratio of internal electromagnetic waves from within the earth to said external electromagnetic waves reaching said linear elements.

5. A method for detecting pre-earthquake electromagnetic waves, comprising the steps of:

positioning in a sea on the sea bottom at a depth which substantially eliminates external electromagnetic waves from above the sea surface a sensor equipped with an antenna for receiving the electromagnetic waves at an increased intensity ratio of internal electromagnetic waves from within earth to said external electromagnetic waves and a receiver for detecting the electromagnetic waves received by said antenna, and connecting said sensor with a land-based observation system by a transmission cable.

6. A method according to claim 5, wherein said antenna is composed of two linear elements each having an insulated wire electrically grounded at one end thereof and each having a length equal to approximately one quarter of the wavelength of the electromagnetic waves to be received.

7. A method according to claim 5, wherein said antenna is a loop antenna.

8. An apparatus for detecting pre-earthquake electromagnetic waves, comprising:

a monopole antenna comprising a linear element formed of a conductive material having a length equal to approximately one quarter of the wavelength of the electromagnetic waves to be received and placed to extend vertically within the earth, and a reflector composed of one or more conductive elements, having a reflection diameter larger than the length of said linear element and placed on the surface of the earth so that a center thereof is at said linear element, thereby substantially preventing external electromagnetic waves above the earth from passing into the earth and reflecting internal electromagnetic waves from within the earth onto said linear element to increase an intensity ratio of the internal electromagnetic waves to the external electromagnetic waves received by said linear element, and a receiver connected between said linear element and said reflector for detecting the electromagnetic waves reaching said linear element.

9. An apparatus according to claim 8, wherein said linear element is a conductive cable inserted in a deep well.

10. An apparatus according to claim 8, wherein said linear element is a steel casing buried in the earth.

11. An apparatus according to claim 8, wherein said reflector consists of a substantially circular conductive plate centered about the linear element.

12. An apparatus according to claim 8, wherein said reflector consists of a plurality of conductive wires radially extending from said linear element.

13. An apparatus according to claim 8, wherein said reflector consists of a plurality of annular-shaped conductive wires laid concentrically with said linear element.

14. An apparatus according to claim 8, wherein said linear element consists of a helical wire.

15. An apparatus for detecting pre-earthquake electromagnetic waves, comprising:

two mooring lines in a sea anchored at their one ends to the sea bottom at a depth which substantially eliminates external electromagnetic waves from above the sea surface and attached at their other ends to a mooring buoy, and two linear elements of insulated conductive material, each having a length equal to approximately one quarter of the wavelength of the electromagnetic waves to be received, electrically connected at their one ends to said mooring lines located at said depth which substantially eliminates said external electromagnetic waves from above the sea surface and connected at their other ends to each other via a receiver for detecting the electromagnetic waves at an increased intensity ratio of internal electromagnetic waves from within the earth to said external electromagnetic waves reaching said linear elements.

16. An apparatus for detecting pre-earthquake electromagnetic waves, comprising:

a sensor for use in a sea equipped with an antenna for receiving the electromagnetic waves at an increased intensity ratio of internal electromagnetic waves from within the earth to external electromagnetic waves above the sea surface and a receiver for detecting the electromagnetic waves received by said antenna, said sensor being positioned on the sea bottom at a depth which substantially eliminates said external electromagnetic waves, said sensor being connected with a land-based observation system by a transmission cable for transmitting the electromagnetic waves detected by said receiver to the land-based observation system through the transmission cable.

17. An apparatus according to claim 16, wherein said antenna is composed of two linear elements each having an insulated wire electrically grounded at one end thereof and each having a length equal to approximately one quarter of the wavelength of the electromagnetic waves to be received.

18. An apparatus according to claim 16, wherein said antenna is a loop antenna.

* * * * *